US012567802B2

(12) United States Patent
Cheng et al.

(10) Patent No.: US 12,567,802 B2
(45) Date of Patent: Mar. 3, 2026

(54) VOLTAGE CONVERTOR MODULE INCLUDING A LEAD-FRAME, A UNITARY BARE DIE AND A MOLDING BODY

(71) Applicant: CYNTEC CO., LTD., Hsinchu (TW)

(72) Inventors: Chih-Tai Cheng, Hsinchu (TW); Pei-Yuan Chen, Hsinchu (TW)

(73) Assignee: CYNTEC CO., LTD., Hsinchu (TW)

( * ) Notice: Subject to any disclaimer, the term of this patent is extended or adjusted under 35 U.S.C. 154(b) by 190 days.

(21) Appl. No.: 18/516,826

(22) Filed: Nov. 21, 2023

(65) Prior Publication Data

US 2024/0178749 A1 May 30, 2024

Related U.S. Application Data

(60) Provisional application No. 63/427,895, filed on Nov. 24, 2022.

(51) Int. Cl.
H02M 3/158 (2006.01)
H02M 3/00 (2006.01)

(52) U.S. Cl.
CPC ......... H02M 3/003 (2021.05); H02M 3/1582 (2013.01)

(58) Field of Classification Search
CPC ........ H02M 3/003; H02M 3/01; H02M 3/156; H02M 3/1582; H02M 3/1584; H02M 3/157; H02M 3/158
See application file for complete search history.

(56) References Cited

U.S. PATENT DOCUMENTS

| | | | |
|---|---|---|---|
| 10,270,239 B2 | 4/2019 | Bahl | |
| 2007/0114983 A1 | 5/2007 | Weng | |
| 2008/0024102 A1* | 1/2008 | Hebert | H01L 24/49 |
| | | | 257/E21.336 |
| 2008/0304306 A1* | 12/2008 | Chang | H01L 25/16 |
| | | | 363/147 |
| 2012/0273929 A1 | 11/2012 | Jiang | |
| 2023/0198376 A1* | 6/2023 | Abesingha | H02M 3/158 |
| | | | 323/282 |

FOREIGN PATENT DOCUMENTS

| | | |
|---|---|---|
| CN | 110890356 A | 3/2020 |
| CN | 113629688 A | 11/2021 |

* cited by examiner

*Primary Examiner* — Nguyen Tran
(74) *Attorney, Agent, or Firm* — Winston Hsu

(57) ABSTRACT

A voltage convertor module includes a lead-frame, a unitary bare die and a molding body. The lead-frame can have a plurality of electrodes including an input voltage electrode, an output voltage electrode, a ground electrode and a controlling electrode. The unitary bare die is disposed only on the lead-frame, where a plurality of pads of the unitary bare die are electrically connected to the electrodes of the lead-frame correspondingly. The unitary bare die includes the plurality of pads, a buck controller block, a first switching unit block, a second switching unit block, a feedback unit block and a plurality of routing structures.

20 Claims, 9 Drawing Sheets

VOLTAGE CONVERTOR MODULE INCLUDING A LEAD-FRAME, A UNITARY BARE DIE AND A MOLDING BODY

CROSS REFERENCE TO RELATED APPLICATIONS

This application claims the benefit of U.S. Provisional Application No. 63/427,895, filed on Nov. 24, 2022. The content of the application is incorporated herein by reference.

BACKGROUND OF THE INVENTION

1. Field of the Invention

The disclosure is related to a voltage convertor module, and more particularly, a voltage convertor module including a lead-frame, a unitary bare die and a molding body.

2. Description of the Related Art

In electronic devices, a direct-current (DC) voltage often has to be converted to a desired voltage level. A buck controller can be used in a DC-to-DC converter to step down an input voltage to a predetermined voltage level. The efficiency of a convertor with a buck controller can be relatively high, making the convertor useful for tasks such as converting a main supply voltage for computers or other electronic devices. However, it is a challenge to integrate a passive component (e.g. inductor) and a buck converter in a package while maintaining sufficient reliability. Hence, a solution is still in need in the field for integrating a passive component with a buck converter. Currently, a plurality of circuit units are not integrated in a bare die, and an external printed circuit board (PCB) must be used to electrically connect the circuit units and an inductor.

SUMMARY OF THE INVENTION

An embodiment provides a voltage convertor module including a lead-frame, a unitary bare die and a molding body. The lead-frame can have a plurality of electrodes including an input voltage electrode, an output voltage electrode, a ground electrode and a controlling electrode. The unitary bare die is disposed only on the lead-frame, where a plurality of pads of the unitary bare die are electrically connected to the electrodes of the lead-frame correspondingly. The unitary bare die includes the plurality of pads, a buck controller block, a first switching unit block, a second switching unit block, a feedback unit block and a plurality of routing structures. The plurality of pads of the unitary bare die are exposed on a surface of the unitary bare die, and the plurality of pads include an input voltage pad, an output voltage pad, a switching pad, a ground pad, and a controlling pad, where the plurality of pads of the unitary bare die are electrically and directly connected to the electrodes of the lead-frame respectively via connection structures. The buck controller block in the unitary bare die includes a first terminal used to receive an input voltage, a second terminal used to receive a feedback signal, a third terminal used to output a first control signal, and a fourth terminal used to output a second control signal, where the first control signal and the second control signal are generated according to at least the feedback signal. The first switching unit block in the unitary bare die includes a control terminal coupled to the third terminal of the buck controller block, a first power terminal coupled to the first terminal of the buck controller block, and a second power terminal coupled to the switching pad and used to output the input voltage at the switching pad according to the first control signal. The second switching unit block in the unitary bare die includes a control terminal coupled to the fourth terminal of the buck controller block, a second power terminal used to receive a reference voltage, and a first power terminal coupled to the switching pad and used to output the reference voltage at the switching pad according to the second control signal. The feedback unit block includes a first terminal coupled to the output voltage pad and used to receive an output voltage, and a second terminal coupled to the second terminal of the buck controller block and used to output the feedback signal according to the output voltage. The plurality of routing structures in the unitary bare die are used to couple the buck controller block, the first switching unit block, the second switching unit block, the feedback unit block and the pads with each other. The molding body can encapsulate the unitary bare die and the lead-frame.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
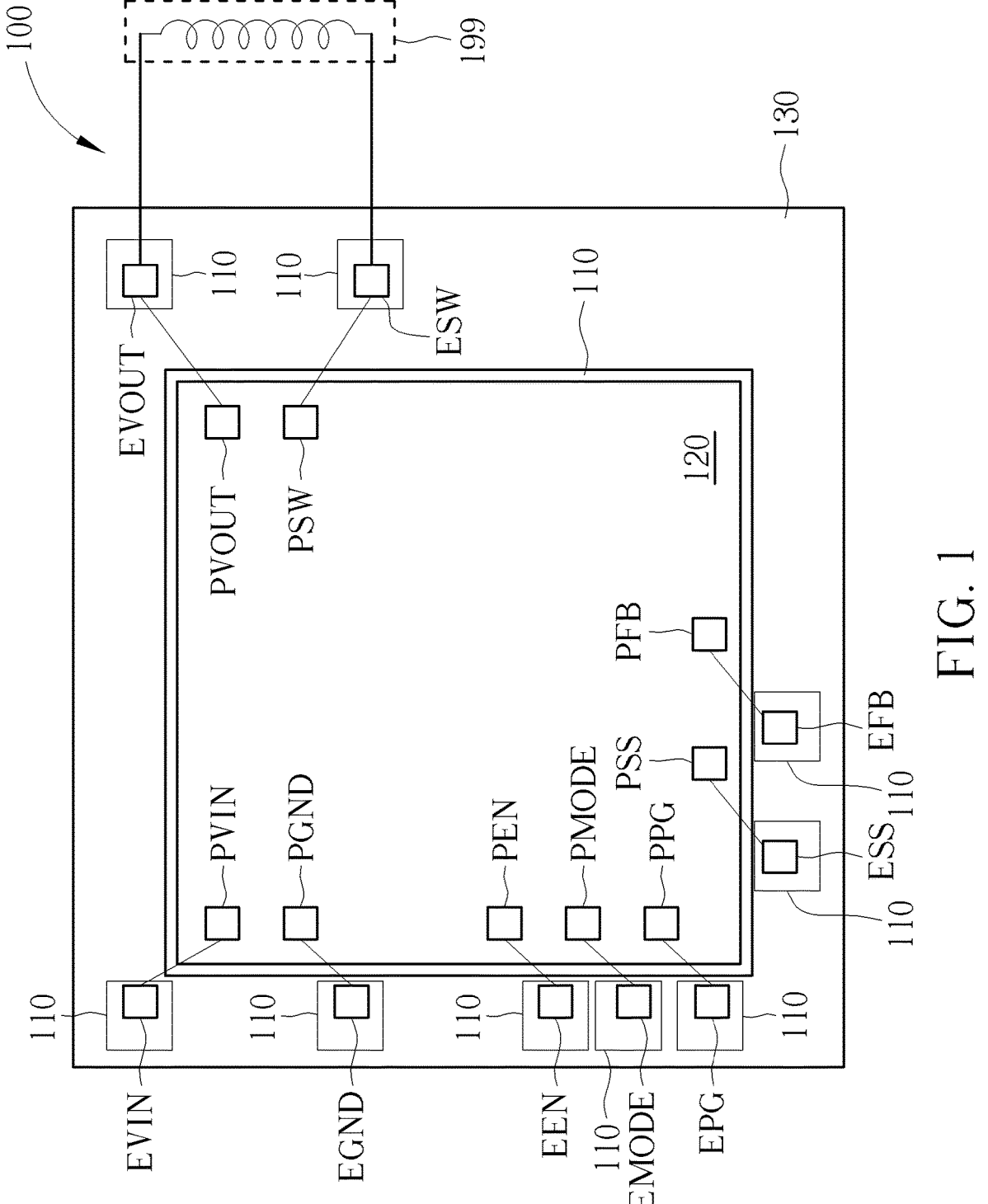
FIG. 1 illustrates a voltage convertor module according to an embodiment.

FIG. 1 illustrates a voltage convertor module 100 according to an embodiment. The voltage convertor module 100 can include a lead-frame 110, a unitary bare (silicon) die 120 and a molding body 130. The lead-frame 110 can have a plurality of electrodes including an input voltage electrode EVIN, an output voltage electrode EVOUT, a switching electrode ESW, a ground electrode EGND and at least one controlling electrode. For example, the at least one controlling electrode can include an enable electrode EEN, a mode electrode EMODE, a power good electrode EPG, a soft-start electrode ESS and a feedback electrode EFB. For example, the switching electrode ESW can be a part of the lead-frame 110. In another example, the switching electrode ESW is not a part of the lead-frame 110.

The unitary bare die 120 can be disposed only on the lead-frame 110. In other words, the circuit of the voltage convertor module 100 can be integrated using only one lead-frame 110. The unitary bare die 120 can include a plurality of pads, and the pads can be electrically connected to the electrodes of the lead-frame 110 correspondingly and respectively.

The pads of the unitary bare die 120 can be exposed on a surface of the unitary bare die 120, and the pads can include an input voltage pad PVIN, an output voltage pad PVOUT, a switching pad PSW, a ground pad PGND, and at least one controlling pad. For example, the at least one controlling pad can include an enable pad PEN, a mode pad PMODE, a power good pad PPG, a soft-start pad PSS and a feedback pad PFB. The pads of the unitary bare die 120 can be electrically and directly connected to the electrodes of the lead-frame 110 respectively via connection structures such as conductive wires and/or solder bumps.

As shown in FIG. 1, the molding body 130 can encapsulate the unitary bare die 120 and the lead-frame 110 to fix and protect the unitary bare die 120 and the lead-frame 110.

As shown in FIG. 1, an inductor 199 can be electrically connected to the switching electrode ESW and the output voltage electrode EVOUT. The inductor 199 can be disposed outside the molding body 130. FIG. 1 can be a conceptual diagram, and as shown in a sectional view in FIG. 9 below, the switching electrode ESW and the output voltage electrode EVOUT can be disposed on a lower side of the molding body 130 and respectively electrically connected to two electrodes on a top side of the molding body 130 to be coupled to the inductor 199.

The pads of the unitary bare die 120 can be disposed on a top side of the unitary bare die 120, and the pads of the unitary bare die 120 can be electrically connected to the electrodes of the lead-frame 110 correspondingly through a plurality of conductive wires.

In another example, the pads of the unitary bare die 120 can be disposed on a lower side of the unitary bare die 120, and the pads of the unitary bare die 120 can be electrically connected to the electrodes of the lead-frame 110 correspondingly through a plurality of conductive wires and alignment.

The molding body 130 can be formed of an insulating material. In the molding body 130, there are only the unitary bare die 120, the lead-frame 110 and the conductive paths connecting the unitary bare die 120 and the lead-frame 110, and no other active electronic component (e.g. transistors) and passive electronic component (e.g. capacitor) are disposed in the molding body 130.

Figure 2:
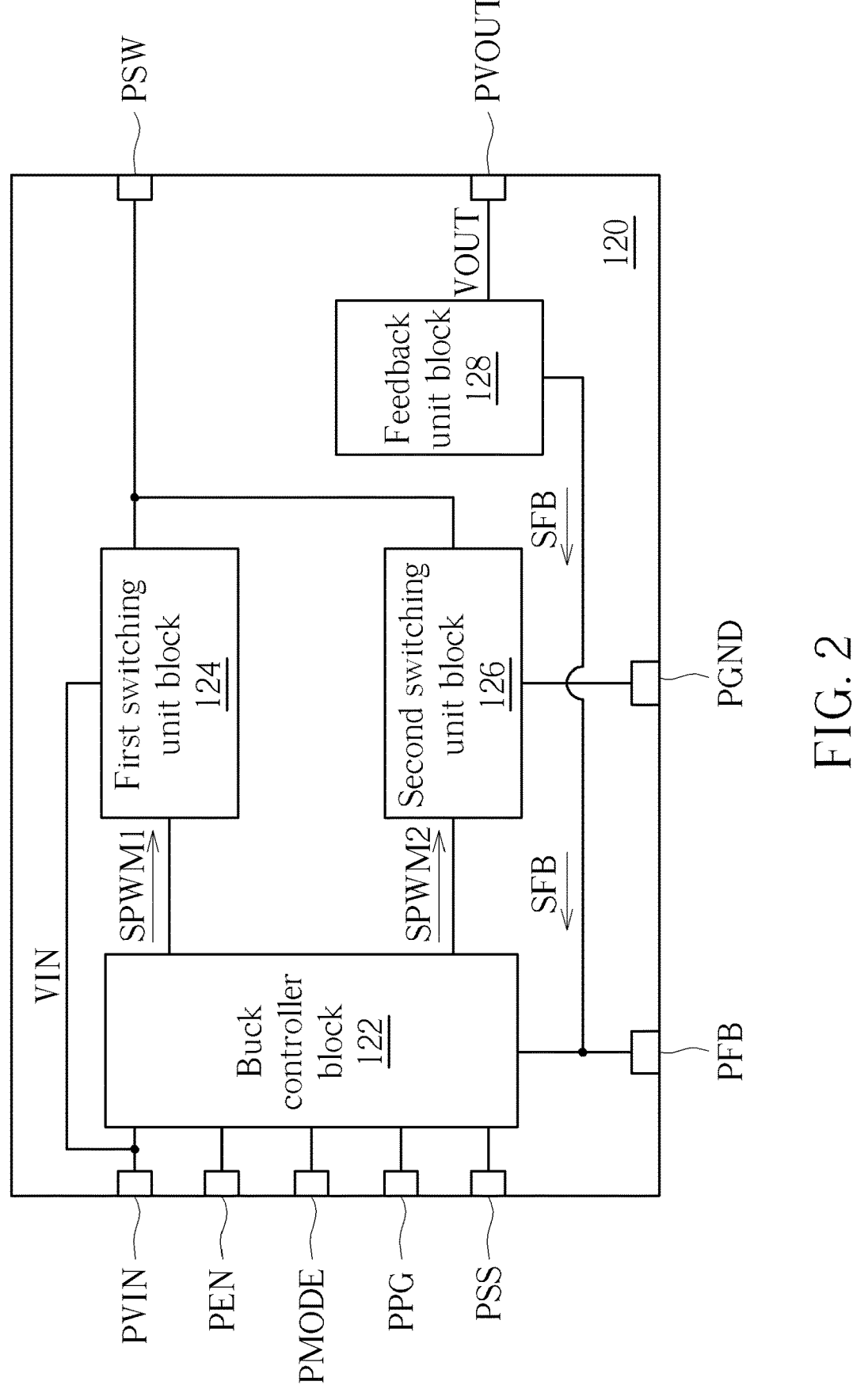
FIG. 2 illustrates the unitary bare die in FIG. 1 according to an embodiment.
Figure 7:
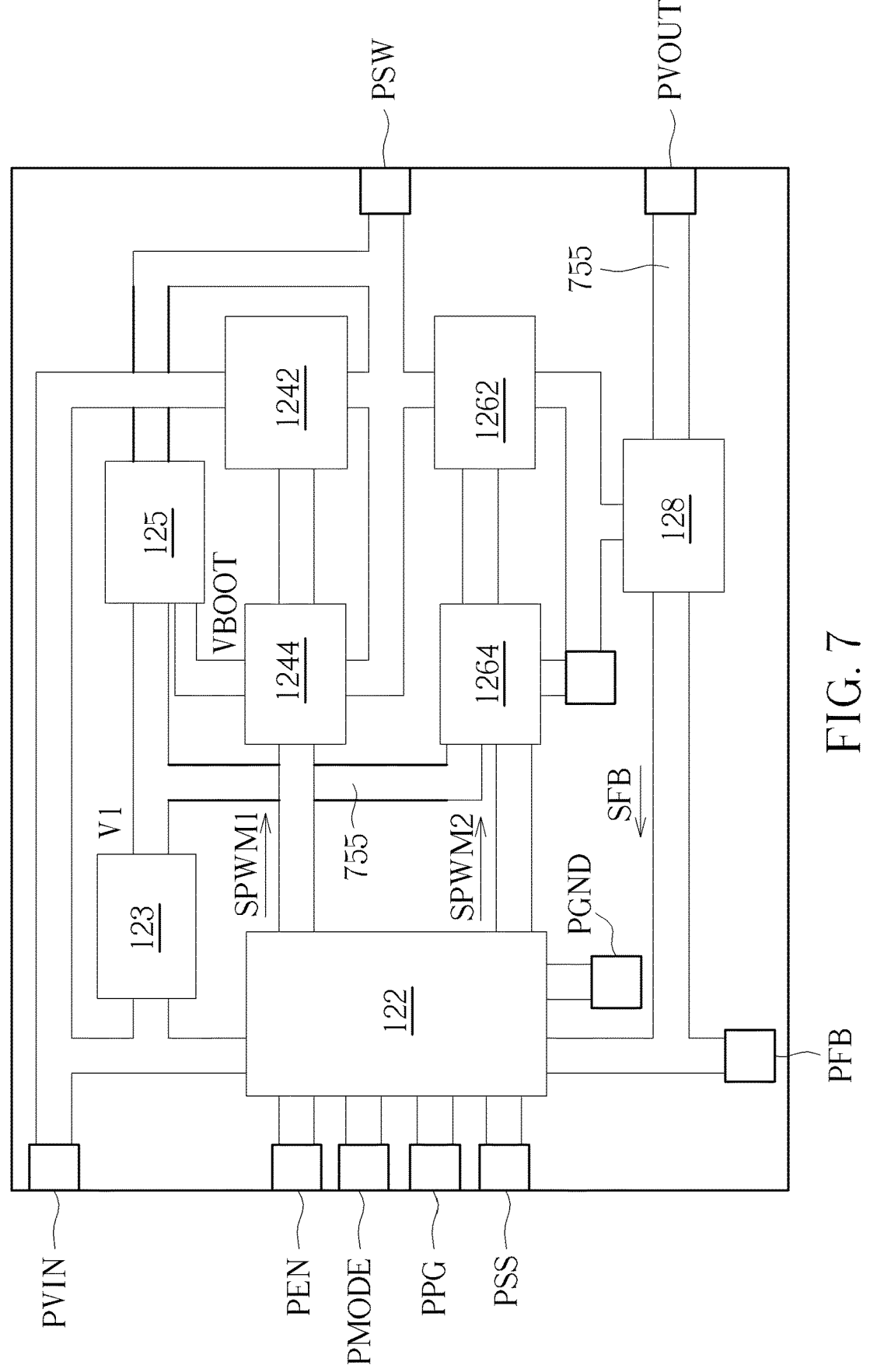
FIG. 7 illustrates a layout diagram of the unitary bare die of FIG. 3 according to an embodiment.
Figure 8:
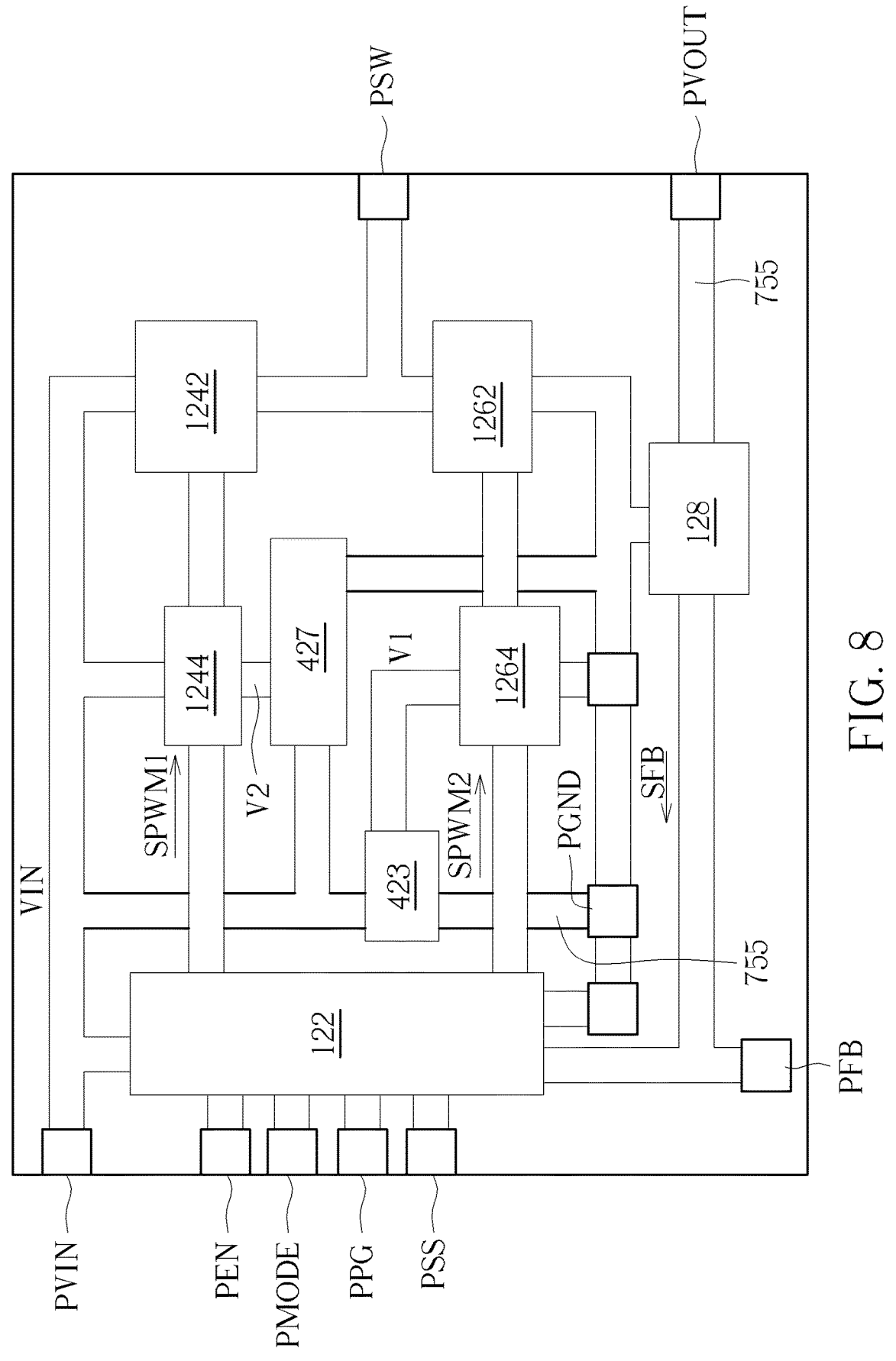
FIG. 8 illustrates a layout diagram of the unitary bare die of FIG. 5 according to another embodiment.

FIG. 2 illustrates the unitary bare die 120 in FIG. 1 according to an embodiment. The unitary bare die 120 can include a buck controller block 122, a first switching unit block 124, a second switching unit block 126, a feedback unit block 128 and a plurality of routing structures 755. The routing structures 755 can be as shown in FIG. 7 and FIG. 8.

The buck controller block 122 can include a first terminal used to receive an input voltage VIN, a second terminal used to receive a feedback signal SFB, a third terminal used to output a first control signal SPWM1, and a fourth terminal used to output a second control signal SPWM2. The first control signal SPWM1 and the second control signal SPWM2 can be generated according to at least the feedback signal SFB.

The buck controller block 122 can further include an enable terminal coupled to the enable pad PEN, a mode terminal coupled to the mode pad PMODE, a power good terminal coupled to the power good pad PPG and a soft-start terminal coupled to the soft-start pad PSS.

The enable pad PEN, the mode pad PMODE, the power good pad PPG and the soft-start pad PSS can be functional pads. The enable pad PEN can be used to enable and disable the buck controller block 120. For example, when the enable pad PEN has a high voltage, the buck controller block 120 can be turned on, and when the enable pad PEN has a low voltage, the buck controller block 120 can be turned off.

The mode pad PMODE can be used to control operation modes of the buck controller block 120. For example, when the mode pad PMODE has a high voltage, the buck controller block 120 can be operated in a continuous conduction mode (CCM), and when the mode pad PMODE has a low voltage, the buck controller block 120 can be operated in a discontinuous conduction mode (DCM).

The power good pad PPG can have a predetermined signal level when the output voltage VOUT reaches a predetermined voltage level, such as 90% of a supplied high voltage. For example, when the output voltage VOUT reaches the predetermined voltage level, the power good pad PPG can have a high voltage.

The soft-start pad PSS can be used to control a waveform of the output voltage VOUT. For example, the soft-start pad PSS can be used to adjust the waveform and the rising speed of the output voltage VOUT using a capacitor.

The first switching unit block 124 in the unitary bare die 120 can include a control terminal coupled to the third terminal of the buck controller block 122 to receive the first control signal SPWM1, a first power terminal coupled to the first terminal of the buck controller block 122 to receive the input voltage VIN, and a second power terminal coupled to the switching pad PSW to output the input voltage VIN at the switching pad PSW according to the first control signal SPWM1.

The second switching unit block 126 in the unitary bare die 120 can include a control terminal coupled to the fourth terminal of the buck controller block 122 to receive the second control signal SPWM2, a second power terminal coupled to the ground pad PGND to receive a reference voltage VGND, and a first power terminal coupled to the switching pad PSW to output the reference voltage VGND at the switching pad PSW according to the second control signal SPWM2.

In the text, the input voltage VIN can be a predetermined reference voltage such as a high reference voltage. The reference voltage VGND can be a predetermined reference voltage such as a low reference voltage or a ground voltage, for example, 0V or negative voltage.

The feedback unit block 128 can include a first terminal coupled to the output voltage pad PVOUT to receive an output voltage VOUT, and a second terminal coupled to the second terminal of the buck controller block to output the feedback signal SFB according to the output voltage VOUT.

As shown in FIG. 2, the routing structures in the unitary bare die 120 can be used to couple the buck controller block 122, the first switching unit block 124, the second switching unit block 126, the feedback unit block 128 and the pads of the unitary bare die 120 with each other.

Figure 3:
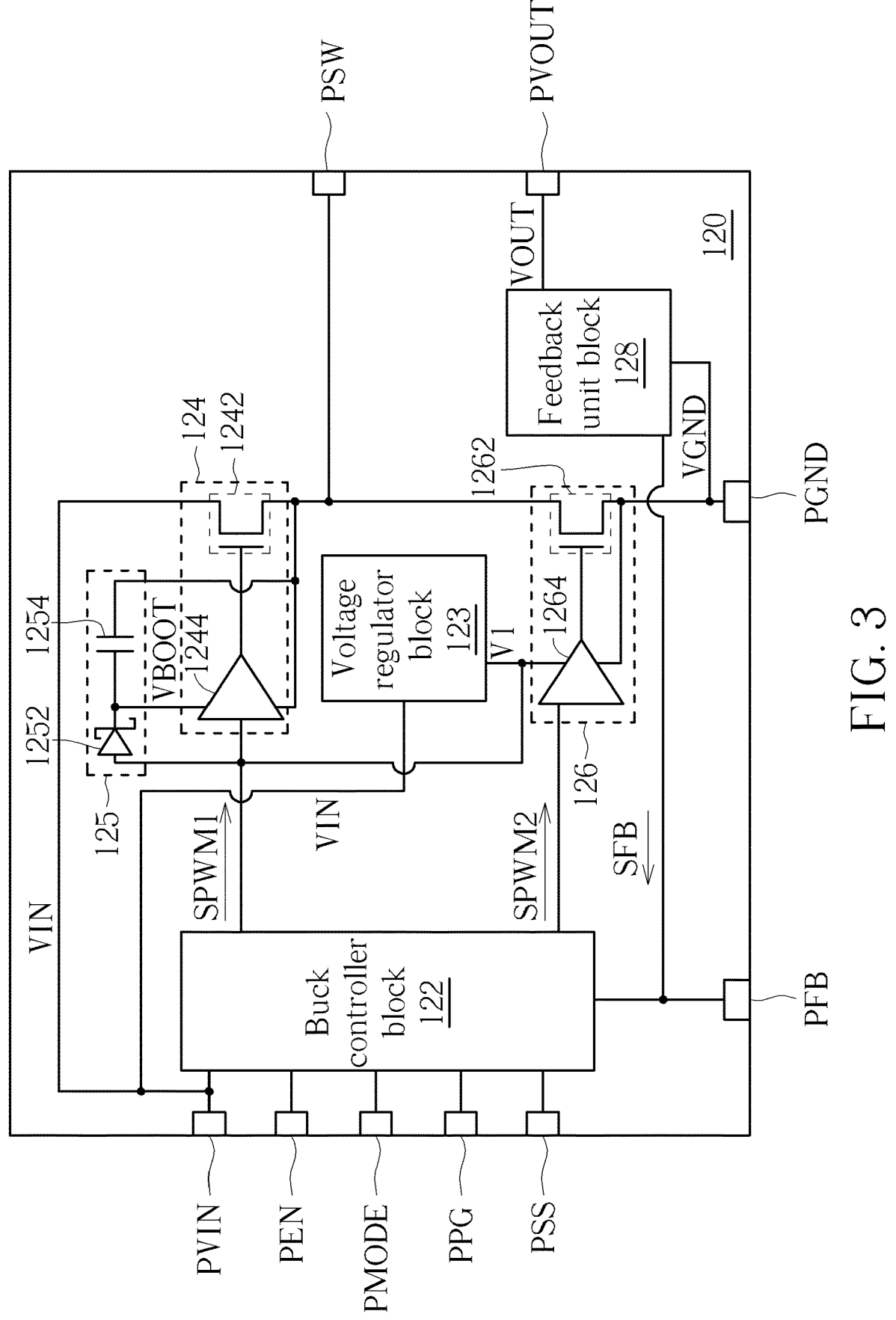
FIG. 3 illustrates the unitary bare die in FIG. 2 according to an embodiment.

FIG. 3 illustrates the unitary bare die 120 in FIG. 2 according to an embodiment. The first switching unit block 124 can include a first switch block 1242 and a first driver block 1244. The first switch block 1242 can include a first terminal, a second terminal and a control terminal, where the first terminal is coupled to the first power terminal of the first switching unit block 124 to receive the input voltage VIN, and the second terminal is coupled to the second power terminal of the first switching unit block 124 and the switch pad PSW.

The first driver block 1244 can include an input terminal coupled to the control terminal of the first switching unit block 124 to receive the first control signal SPWM1, and an output terminal coupled to the control terminal of the first switch block 1242.

The second switching unit block 126 can include a second switch block 1262 and a second driver block 1264. The second switch block 1262 can include a first terminal, a second terminal and a control terminal, where the first terminal can be coupled to the first power terminal of the second switching unit block 126 and the switch pad PSW, and the second terminal can be coupled to the second power terminal of the second switching unit block 126 to receive the reference voltage VGND.

The second driver block 1264 can include an input terminal coupled to the control terminal of the second switching unit block 126 to receive the second control signal SPWM2, and an output terminal coupled to the control terminal of the second switch block 1262.

The unitary bare die 120 can further include a bootstrap unit block 125. The bootstrap unit block 125 can include a first terminal, a second terminal and a third terminal, where the first terminal is coupled to the third terminal of the buck controller block 122 to receive the first control signal SPWM1, the second terminal is coupled to the first driver block 1244 to output a boot voltage VBOOT, and the third terminal is coupled to the second terminal of the first switch block 1242.

The bootstrap unit block 125 can further include a diode 1252 and a capacitor 1254. The diode 1252 can include an input terminal coupled to the first terminal of the bootstrap unit 125, and an output terminal coupled to the second terminal of the bootstrap unit block 125. The capacitor 1254 can include a first terminal coupled to the output terminal of the diode 1252, and a second terminal coupled to the third terminal of the bootstrap unit block 125. The diode 1252 may be a Schottky diode. With the bootstrap unit block 125, no external capacitor is required to be connected to the unitary bare die 120.

The second terminal of the bootstrap unit block 125 can be used to output the boot voltage VBOOT, and the boot voltage VBOOT can be larger than the input voltage VIN. The boot voltage VBOOT can be equal to the sum of a voltage at the switching pad PSW and a cross voltage of the capacitor 1254.

Figure 4:
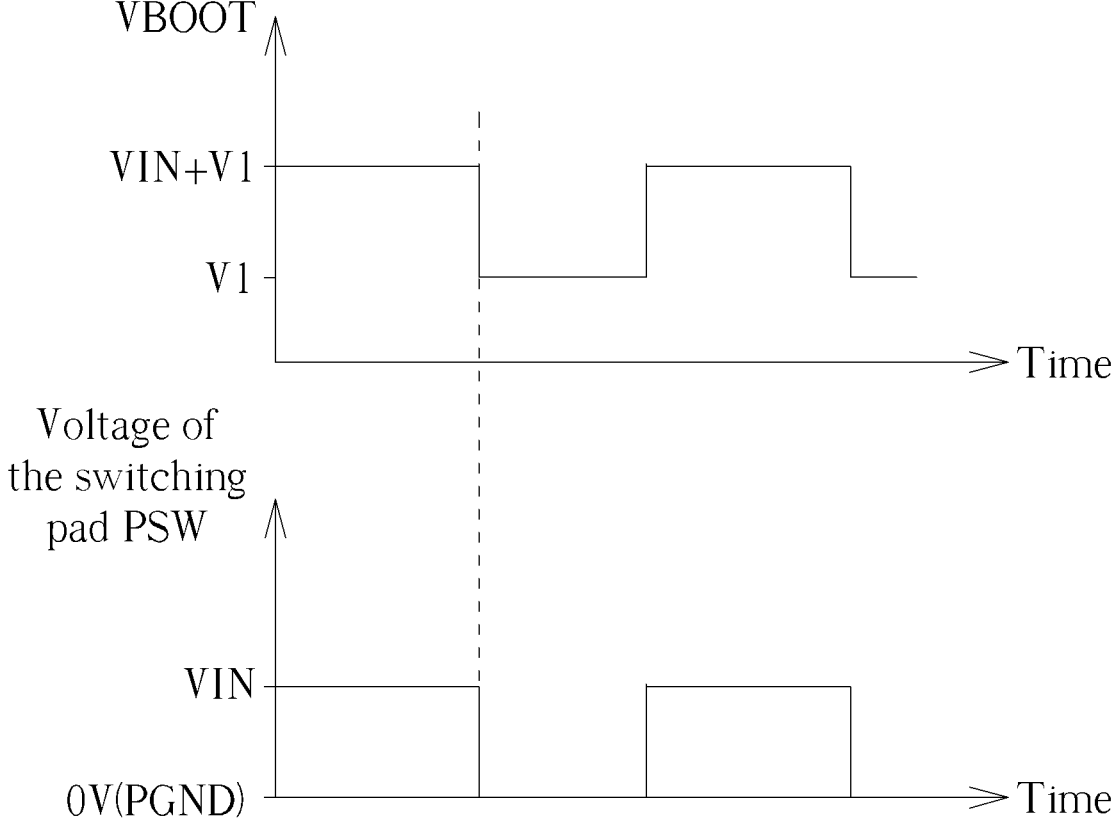
FIG. 4 illustrates the waveforms of the boot voltage and a voltage of the switching pad according to an embodiment.

The maximum of the boot voltage VBOOT can be a breakdown voltage of the diode 1252 (e.g. fast response diode or Schottky diode). FIG. 4 illustrates the waveforms of the boot voltage VBOOT and a voltage of the switching pad PSW according to an embodiment. In FIG. 3 and FIG. 4, when the first switching unit block 124 is turned off, and the second switching unit block 126 is turned on, the diode 1252 can accelerate the charging of the capacitor 1254, so the boot voltage VBOOT and the cross voltage of the capacitor 1254 can rapidly increase to a first voltage V1, where the voltage drop across the diode 1252 can be omitted. When the first switching unit block 124 is turned on, and the second switching unit block 126 is turned off, the diode 1252 (e.g. Schottky diode) can prevent the capacitor 1254 from being discharged through the diode 1252, so the boot voltage VBOOT can be a sum of the input voltage VIN and the first voltage V1 substantially, and it can be expressed as VBOOT=VIN+V1, where the voltage drop across the diode 1252 and a voltage drop of the first switching unit block 124 in the ON state can be omitted. When the first driver block 1244 is controlled by the first control signal SPWM1 to drive and turned on the first switching unit block 124, the gate-source voltage of the first switch block 1242 can be larger than a threshold voltage of the first switch block 1242, it can expressed as Vgs>Vth.

The unitary bare die 120 does not have a pad coupled to the second terminal of the bootstrap unit block 125. In other words, the bootstrap unit block 125 can be used to provide the boot voltage VBOOT without being coupled to an external component such as a capacitor outside the unitary bare die 120.

In FIG. 3, the first switch block 1242 can include an N-type transistor formed of a metal-oxide-semiconductor field-effect transistor, a bipolar junction transistor, an insulated gate bipolar transistor, or a field-effect transistor. The second switch block 1262 can include an N-type transistor formed of a metal-oxide-semiconductor field-effect transistor, a bipolar junction transistor, an insulated gate bipolar transistor, or a field-effect transistor.

The unitary bare die 120 can further include a voltage regulator block 123 used to generate a first voltage V1. The voltage regulator block 123 can include a first terminal used to receive the input voltage VIN, and a second terminal used to output the first voltage V1.

As shown in FIG. 3, the feedback unit block 128 can further include a third terminal coupled to the ground pad PGND to receive the reference voltage VGND.

Figure 5:
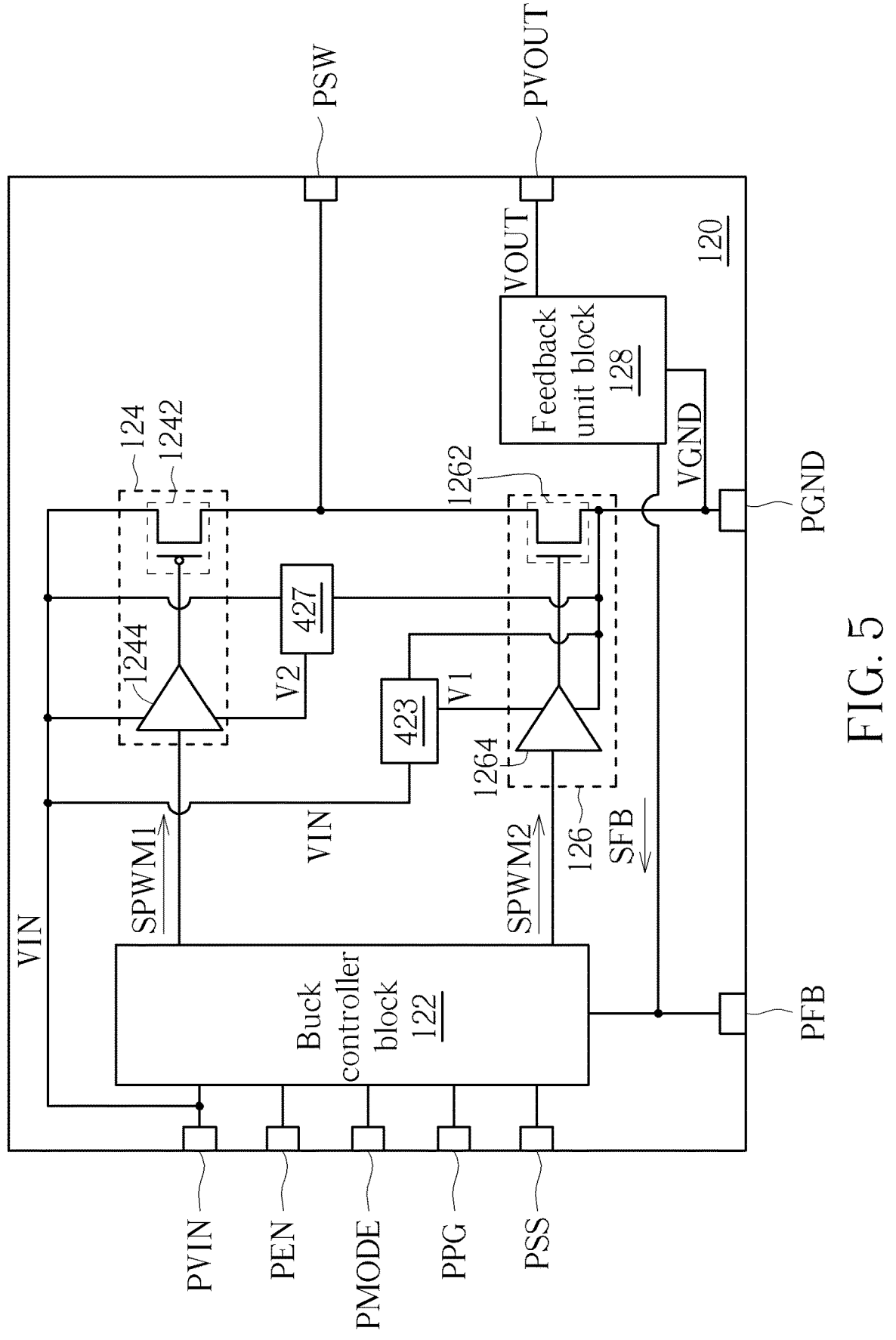
FIG. 5 illustrates the unitary bare die in FIG. 2 according to another embodiment.

FIG. 5 illustrates the unitary bare die 120 in FIG. 2 according to another embodiment. The first switch block 1242 in FIG. 5 can include a P-type transistor formed of a metal-oxide-semiconductor field-effect transistor, a bipolar junction transistor, an insulated gate bipolar transistor, or a field-effect transistor. The second switch block 1262 in FIG. 5 can include an N-type transistor formed of a metal-oxide-semiconductor field-effect transistor, a bipolar junction transistor, an insulated gate bipolar transistor, or a field-effect transistor.

In FIG. 5, the unitary bare die 120 can include a first voltage regulator block 423 and a second voltage regulator block 427. The first voltage regulator 423 can generate a first voltage V1. The first voltage regulator block 423 can include a first terminal, a second terminal and a third terminal, where the first terminal can receive the input voltage VIN, the second terminal can output the first voltage V1, and the third terminal can receive the reference voltage VGND. The second voltage regulator block 427 can generate a second voltage V2. The second voltage regulator block 427 can include a first terminal, a second terminal and a third terminal, where the first terminal can receive the input voltage VIN, the second terminal can output the second voltage V2, and the third terminal can receive the reference voltage VGND.

The first driver block 1244 can further include a first voltage terminal to receive the input voltage VIN, and a second voltage terminal coupled to the second terminal of the second voltage regulator block 427 to receive the second voltage V2. The second driver block 1264 can further include a first voltage terminal coupled to the second terminal of the first voltage regulator block 423 to receive the first voltage V1, and a second voltage terminal to receive the reference voltage VGND.

In FIG. 3 and FIG. 5, when the first switch block 1242 is turned on and the second switch block 1262 is turned off, the inductor 199 can store electrical energy and the current (or current of inductor) flowing to the load element externally coupled to the output voltage electrode EVOUT would increase. When the first switch block 1242 is turned off and the second switch block 1262 is turned on, the energy stored in the inductor 199 can be released from the inductor 199, and the current (or current of inductor) flowing to the load element would be reduced. The feedback signal SFB can be used to monitor the voltage at the output voltage pad PVOUT for the buck controller block 122 to control the duty cycles or/and frequency of the first control signal SPWM1 and the second control signal SPWM2 for controlling the first switch block 1242 and the second switch block 1262 in PWM mode operation.

Figure 6:
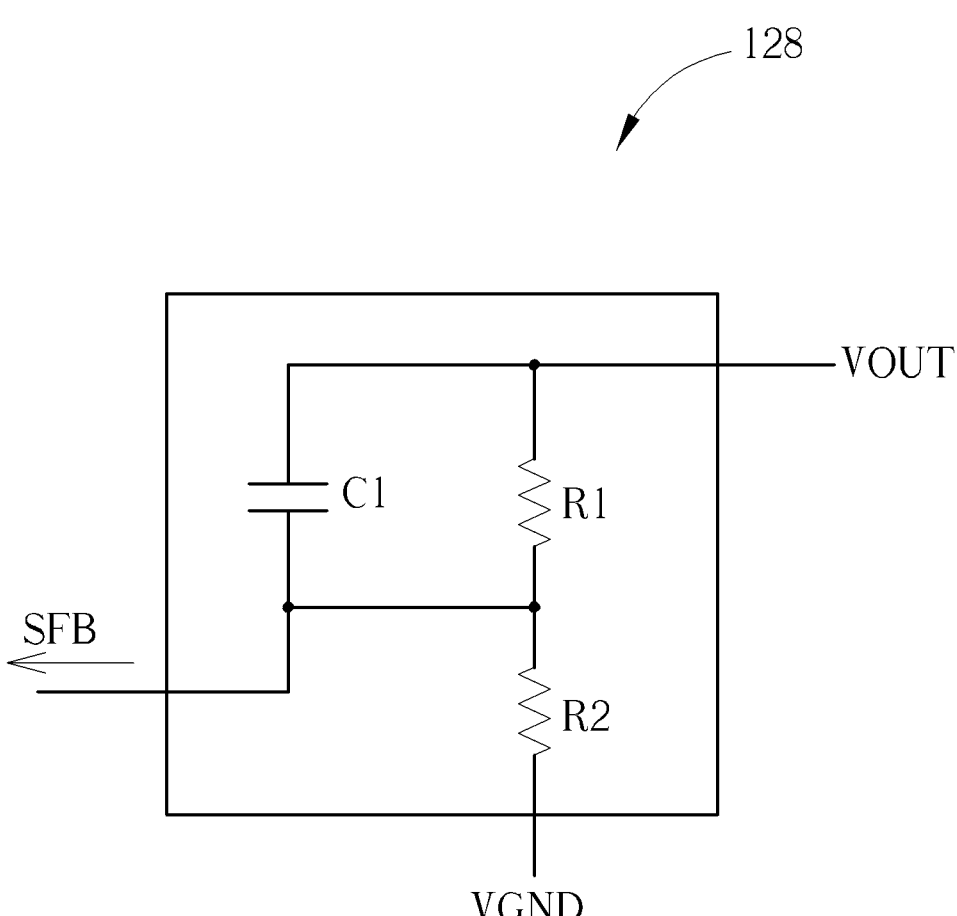
FIG. 6 illustrates the feedback unit block in FIG. 2, FIG. 3 and FIG. 5 according to an embodiment.

FIG. 6 illustrates the feedback unit block 128 in FIG. 2, FIG. 3 and FIG. 5 according to an embodiment. The feedback unit block 128 can include a resistor R1, a resistor R2 and a capacitor C1. The resistor R1 can include a first terminal to receive the output voltage VOUT, and a second terminal. The resistor R2 can include a first terminal coupled to the second terminal of the resistor R1, and a second terminal to receive the reference voltage VGND. The capacitor C1 can include a first terminal coupled to the first terminal of the resistor R1, and a second terminal coupled to the second terminal of the resistor R1 for generating the feedback signal SFB.

FIG. 7 illustrates a layout diagram of the unitary bare die 120 of FIG. 3 according to an embodiment. FIG. 8 illustrates a layout diagram of the unitary bare die 120 of FIG. 5 according to another embodiment. The layout diagram of the unitary bare die 120 can be adjusted according to requirements. As shown in FIG. 7, it is unnecessary to dispose an additional pad for coupling the bootstrap unit block 125 to an external device outside the unitary bare die 120. A plurality of functional circuits (e.g. the buck controller block 122, the first switching unit block 124, the second switching unit block 126, the feedback unit block 128, the bootstrap unit block 125, and the voltage regulator block) can be integrated in the unitary bare die 120, and the functional circuits can be electrically connected through routing structures 755 in the unitary bare die 120.

Figures 9, 10:
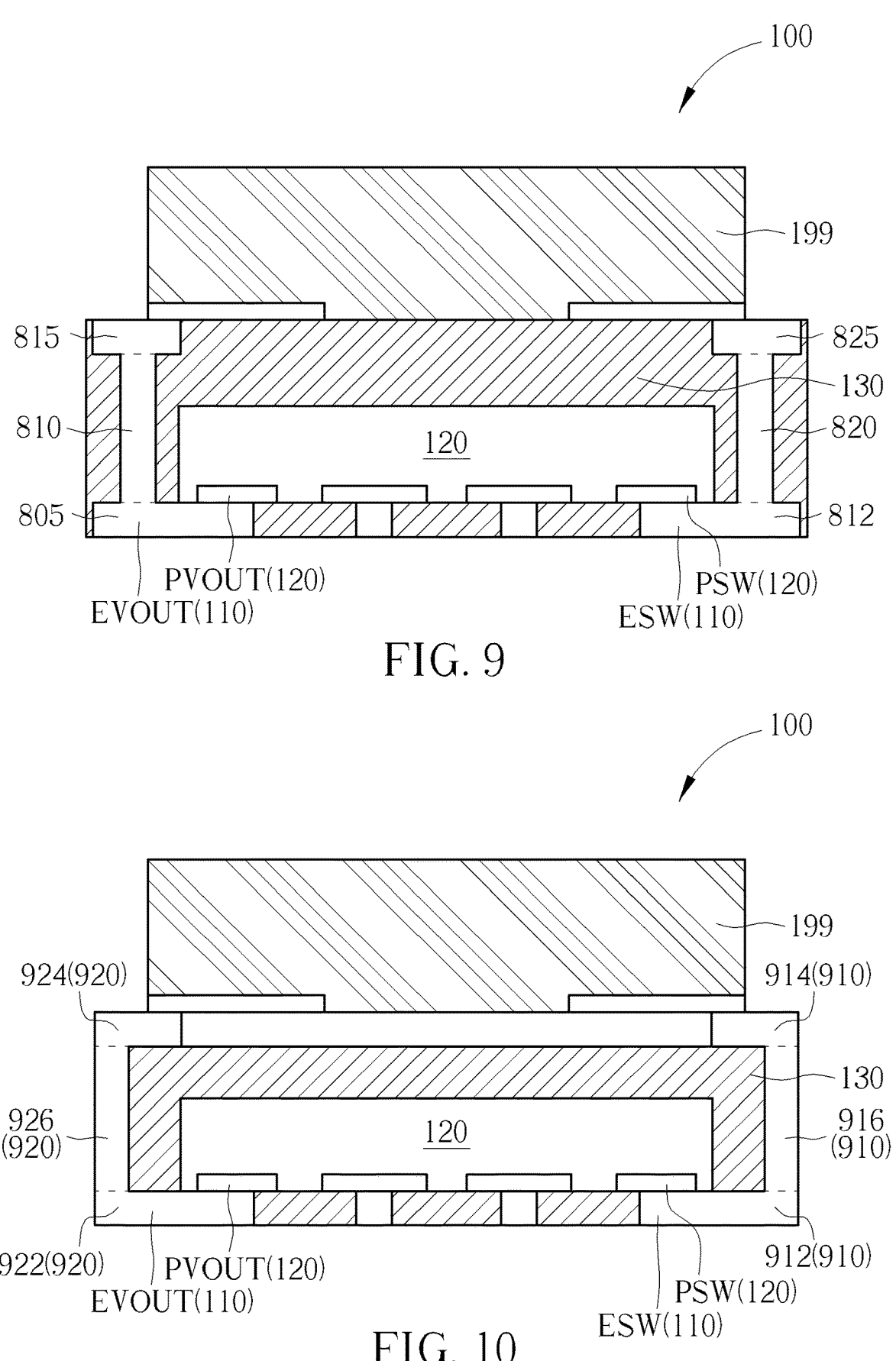
FIG. 9 illustrates a sectional view of the voltage convertor module according to an embodiment.
FIG. 10 illustrates the voltage convertor module according to another embodiment.

FIG. 9 illustrates a sectional view of the voltage convertor module 100 according to an embodiment. In FIG. 9, the unitary bare die 120 can be disposed on the lead-frame 110, and the molding body 130 can encapsulate the unitary bare die 120 and the lead-frame 110 with the switching electrode ESW and the output voltage electrode EVOUT disposed on a lower side of the molding body 130. The output voltage electrode EVOUT can be electrically connected to an electrode 805. The switching electrode ESW can be electrically connected to an electrode 812. A conductive path 810 can pass through the compound layer of the molding body 130 to electrically connect the electrode 805 to an electrode 815. A conductive path 820 can pass through the compound layer of the molding body 130 to electrically connect the electrode 812 to an electrode 825. The electrodes 815 and 825 can be disposed on the top side of the molding body 130. The inductor 199 can be disposed on the top side of the molding body 130. The first terminal of the inductor 199 can be coupled to the electrode 815, and the second terminal of the inductor 199 can be coupled to the electrode 825. Since the electrodes 815 and 825 are exposed on the top side of the molding body 130, the inductor 199 can be easily coupled to the electrodes 815 and 825, and the reliability of the voltage convertor module 100 is improved because it is less prone to cracks. In FIG. 9, the conductive paths 810 and 820 can be implemented using metal pillars, such as copper pillars.

FIG. 10 illustrates the voltage convertor module 100 according to another embodiment. The inductor 199 can include a first terminal electrically connected to the switching electrode ESW, and a second terminal electrically connected to the output voltage electrode EVOUT. The voltage convertor module 100 can include a first lead 910 and a second lead 920. The first lead 910 can be trimmed and formed to have a first portion 912 electrically connected to the switching electrode ESW, a second portion 914 electrically connected to the first terminal of the inductor 199, and a third portion 916 electrically connected to the first portion 912 and the second portion 914 of the first lead 910. The third portion 916 of the first lead 910 is not in parallel with the first portion 912 and the second portion 914 of the first lead 910.

The second lead 920 can be trimmed and formed to have a first portion 922 electrically connected to the output voltage electrode EVOUT, a second portion 924 electrically connected to the second terminal of the inductor 199, and a third portion 926 electrically connected to the first portion 922 and the second portion 924 of the second lead 920. The third portion 926 of the second lead 920 is not in parallel with the first portion 922 and the second portion 924 of the second lead 920.

According to another embodiment, the output voltage pad PVOUT and the output voltage electrode EVOUT can be as shown in FIG. 9 or FIG. 10. However, the switching pad PSW can be corresponding to the top side of the unitary bare die 120, and the switching electrode ESW can be corresponding to the top side of the molding body 130 instead of the lower side of the molding body 130. For example, the switching pad PSW can be exposed on the top side of the unitary bare die 120, and the switching electrode ESW can be exposed on the top side of the molding body 130 instead of the lower side of the molding body 130. The switching pad PSW can be electrically connected to the switching electrode ESW via a conductive path. The inductor 199 can be placed or stacked on the top side of the molding body 130. The switching electrode ESW can be directly coupled to the inductor 199, for example, via a soldering path. In this embodiment, no electrode electrically connected to the switching electrode is exposed on a soldering surface on the lower side of the molding body. Since the switching electrode ESW is not disposed on the lower side of the molding body 130, the bottom area of the voltage convertor module 100 is reduced, and the layout of the circuit board (e.g. PCB) of the system is simplified.

In summary, with the voltage convertor module 100, it is easier to electrically connect the inductor 199 to the switching electrode ESW and the output voltage electrode EVOUT, and the reliability is improved according to measurement. It is unnecessary to use an additional pad for coupling the bootstrap unit block 125 to an external device outside the unitary bare die 120. Hence, the problems related to buck controller and DC-to-DC converter are eliminated. According to embodiments, a plurality of circuit units are integrated in a bare die (e.g. unitary bare die 120), so an external printed circuit board (PCB) is no longer necessary for electrically connecting the circuit units and an inductor. Preferably, the inductor 199 can be disposed and stacked over a surface of the mold body 130, and the lower electrodes of the inductor 199 can be electrically connected to the upper electrodes of the mold body 130 directly. Preferably, only the input voltage electrode EVIN, the output voltage electrode EVOUT, the switching electrode ESW, and the ground electrode EGND are exposed on the voltage convertor module 100. As a result, the whole system and the layout on a related circuit board (e.g. PCB) are effectively simplified, the related cost is reduced, and the reliability is improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A voltage convertor module, comprising:

a lead-frame having a plurality of electrodes comprising an input voltage electrode, an output voltage electrode, a ground electrode and a controlling electrode;

a unitary bare die disposed only on the lead-frame, wherein a plurality of pads of the unitary bare die are electrically connected to the electrodes of the lead-frame correspondingly, the unitary bare die comprises:

the plurality of pads exposed on a surface of the unitary bare die, and the plurality of pads comprise an input voltage pad, an output voltage pad, a switching pad, a ground pad, and a controlling pad, wherein the plurality of pads of the unitary bare die are electrically and directly connected to the electrodes of the lead-frame respectively via connection structures;

a buck controller block in the unitary bare die comprising a first terminal configured to receive an input voltage, a second terminal configured to receive a feedback signal, a third terminal configured to output a first control signal, and a fourth terminal configured to output a second control signal, wherein the first control signal and the second control signal are generated according to at least the feedback signal;

a first switching unit block in the unitary bare die comprising a control terminal coupled to the third terminal of the buck controller block, a first power terminal coupled to the first terminal of the buck controller block, and a second power terminal coupled to the switching pad and configured to output the input voltage at the switching pad according to the first control signal;

a second switching unit block in the unitary bare die comprising a control terminal coupled to the fourth terminal of the buck controller block, a second power terminal configured to receive a reference voltage, and a first power terminal coupled to the switching pad and configured to output the reference voltage at the switching pad according to the second control signal;

a feedback unit block comprising a first terminal coupled to the output voltage pad and configured to receive an output voltage, and a second terminal coupled to the second terminal of the buck controller block and configured to output the feedback signal according to the output voltage; and a plurality of routing structures in the unitary bare die configured to couple the buck controller block, the first switching unit block, the second switching unit block, the feedback unit block and the pads with each other; and a molding body encapsulating the unitary bare die and the lead-frame.

2. The voltage convertor module of claim 1, further comprising:

an inductor comprising a first terminal coupled to a switching electrode, and a second terminal coupled to the output voltage electrode;

wherein:

the switching electrode is electrically connected to a first electrode on a lower side of the molding body and a second electrode on a top side of the molding body; and the output voltage electrode is electrically connected to a third electrode on the lower side of the molding body and a fourth electrode on the top side of the molding body.

3. The voltage convertor module of claim 1, wherein the first switching unit block in the unitary bare die further comprises:

a first switch block comprising a first terminal coupled to the first power terminal of the first switching unit block, a second terminal coupled to the second power terminal of the first switching unit block, and a control terminal; and a first driver block comprising an input terminal coupled to the control terminal of the first switching unit block, and an output terminal coupled to the control terminal of the first switch block.

4. The voltage convertor module of claim 3, wherein the second switching unit block in the unitary bare die further comprises:

a second switch block comprising a first terminal coupled to the first power terminal of the second switching unit block, a second terminal coupled to the second power terminal of the second switching unit block, and a control terminal; and a second driver block comprising an input terminal coupled to the control terminal of the second switching unit block, and an output terminal coupled to the control terminal of the second switch block.

5. The voltage convertor module of claim 4, further comprising a bootstrap unit block, wherein:

the bootstrap unit block comprises a first terminal coupled to the third terminal of the buck controller block, a second terminal coupled to the first switching unit block, and a third terminal coupled to the second terminal of the first switch block; and the unitary bare die does not have a pad coupled to the second terminal of the bootstrap unit block.

6. The voltage convertor module of claim 5, wherein the first switch block comprises an N-type transistor formed of a metal-oxide-semiconductor field-effect transistor, a bipolar junction transistor, an insulated gate bipolar transistor, or a field-effect transistor.

7. The voltage convertor module of claim 5, wherein the bootstrap unit block further comprises:

a diode comprising an input terminal coupled to the first terminal of the bootstrap unit block, and an output terminal coupled to the second terminal of the bootstrap unit block; and a capacitor comprising a first terminal coupled to the output terminal of the diode, and a second terminal coupled to the third terminal of the bootstrap unit block.

8. The voltage convertor module of claim 7, wherein the second terminal of the bootstrap unit block is configured to provide a boot voltage larger than the input voltage, and the boot voltage is equal to a voltage at the switching pad plus a voltage of the capacitor.

9. The voltage convertor module of claim 5, further comprising:

a voltage regulator block configured to generate a first voltage, wherein the voltage regulator block comprises a first terminal configured to receive the input voltage, and a second terminal configured to output the first voltage;

wherein:

the first driver block further comprises a first voltage terminal coupled to the second terminal of the bootstrap unit block and configured to receive the boot voltage, and a second voltage terminal coupled to the second terminal of the first switch block; and the second driver block further comprises a first voltage terminal coupled to the second terminal of the voltage regulator block and configured to receive the first voltage, and a second voltage terminal configured to receive the reference voltage.

10. The voltage convertor module of claim 4, wherein the first switch block comprises a P-type transistor formed of a metal-oxide-semiconductor field-effect transistor, a bipolar junction transistor, an insulated gate bipolar transistor, or a field-effect transistor.

11. The voltage convertor module of claim 4, wherein the second switch block comprises an N-type transistor formed of a metal-oxide-semiconductor field-effect transistor, a bipolar junction transistor, an insulated gate bipolar transistor, or a field-effect transistor.

12. The voltage convertor module of claim 4, further comprising:

a first voltage regulator block configured to generate a first voltage, the first voltage regulator block comprising a first terminal configured to receive the input voltage, a second terminal configured to output the first voltage, and a third terminal configured to receive the reference voltage; and a second voltage regulator block configured to generate a second voltage, the second voltage regulator block comprising a first terminal configured to receive the input voltage, a second terminal configured to output the second voltage, and a third terminal configured to receive the reference voltage;

wherein:

the first driver block further comprises a first voltage terminal configured to receive the input voltage, and a second voltage terminal coupled to the second terminal of the second voltage regulator block; and the second driver block further comprises a first voltage terminal coupled to the second terminal of the first voltage regulator block and configured to receive the first voltage, and a second voltage terminal configured to receive the reference voltage.

13. The voltage convertor module of claim 1, wherein:

the unitary bare die further comprises a plurality of functional pads coupled to the buck controller block in the unitary bare die;

the functional pads comprise an enable pad, a mode pad, a power good pad and a soft-start pad;

the enable pad is used to enable and disable the buck controller block;

the mode pad is used to control operation modes of the buck controller block;

the power good pad has a predetermined signal level when the output voltage reaches a predetermined voltage level; and the soft-start pad is used to control a waveform of the output voltage.

14. The voltage convertor module of claim 1, wherein:

the pads of the unitary bare die are disposed on a top side of the unitary bare die; and the pads of the unitary bare die are electrically connected to the electrodes of the lead-frame correspondingly through a plurality of conductive wires.

15. The voltage convertor module of claim 1, wherein:

the pads of the unitary bare die are disposed on a lower side of the unitary bare die; and the pads of the unitary bare die are electrically connected to the electrodes of the lead-frame correspondingly through a plurality of conductive wires and alignment.

16. The voltage convertor module of claim 1, wherein the molding body is formed of an insulating material.

17. The voltage convertor module of claim 1, wherein in the molding body, there are only the unitary bare die and the lead-frame, and no other active electronic components and passive electronic components.

18. The voltage convertor module of claim 1, wherein:

the feedback unit block further comprises a third terminal configured to receive the reference voltage.

19. The voltage convertor module of claim 1, further comprising:

an inductor comprising a first terminal electrically connected to a switching electrode, and a second terminal electrically connected to the output voltage electrode;

a first lead trimmed and formed to have a first portion electrically connected to the switching electrode, a second portion electrically connected to the first terminal of the inductor, and a third portion electrically connected to the first portion and the second portion of the first lead, wherein the third portion of the first lead is not in parallel with the first portion and the second portion of the first lead; and a second lead trimmed and formed to have a first portion electrically connected to the output voltage electrode, a second portion electrically connected to the second terminal of the inductor, and a third portion electrically connected to the first portion and the second portion of the second lead, wherein the third portion of the second lead is not in parallel with the first portion and the second portion of the second lead.

20. The voltage convertor module of claim 1, wherein:

the switching pad of the unitary bare die is corresponding to a top side of the unitary bare die;

a switching electrode is corresponding to a top side of the molding body;

the switching pad is coupled to the switching electrode;

the voltage convertor module further comprises an inductor placed on the top side of the molding body;

no electrode electrically connected to the switching electrode is exposed on a soldering surface on a lower side of the molding body; and the inductor comprises a first terminal electrically connected to the switching electrode, and a second terminal electrically connected to the output voltage electrode on the top side of the molding body.

* * * * *